US010614685B2

(12) United States Patent
Terada et al.

(10) Patent No.: US 10,614,685 B2
(45) Date of Patent: Apr. 7, 2020

(54) SURVEILLANCE DOOR MONITOR APPARATUS AND METHOD WITH IR SENSORS AND WRONG-WAY ENTRY DETECTION

(71) Applicant: Panasonic Intellectual Property Management Co., Ltd., Osaka (JP)

(72) Inventors: Takashi Terada, Fukuoka (JP); Toshinori Komesu, Fukuoka (JP); Kenji Ichikawa, Fukuoka (JP); Yuya Kuroki, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/886,703

(22) Filed: Feb. 1, 2018

(65) Prior Publication Data

US 2019/0130711 A1    May 2, 2019

(30) Foreign Application Priority Data

Oct. 27, 2017 (JP) ................. 2017-208337

(51) Int. Cl.
*G08B 13/196* (2006.01)
*H04N 7/18* (2006.01)
*H04N 5/225* (2006.01)
*G08B 25/10* (2006.01)
*G08B 25/08* (2006.01)

(52) U.S. Cl.
CPC ....... *G08B 13/19617* (2013.01); *G08B 25/08* (2013.01); *G08B 25/10* (2013.01); *H04N 5/225* (2013.01); *H04N 5/2257* (2013.01); *H04N 7/18* (2013.01); *H04N 7/183* (2013.01); *G08B 13/19613* (2013.01)

(58) Field of Classification Search
CPC ............................. G08B 13/19652; H04N 7/18
See application file for complete search history.

(56) References Cited

U.S. PATENT DOCUMENTS

| | | | | |
|---|---|---|---|---|
| 4,249,207 A * | 2/1981 | Harman | ............. | G06K 9/00771 340/541 |
| 5,980,123 A * | 11/1999 | Heifler | ............. | G08B 13/19608 340/567 |
| 6,154,133 A * | 11/2000 | Ross | ................ | G08B 13/19643 340/541 |
| 6,570,496 B2 * | 5/2003 | Britton | ............. | G08B 13/19656 340/506 |

(Continued)

FOREIGN PATENT DOCUMENTS

JP    2010-246056 A    10/2010

*Primary Examiner* — Jamie J Atala
*Assistant Examiner* — Michael Robert Cammarata
(74) *Attorney, Agent, or Firm* — Seed IP Law Group LLP

(57) ABSTRACT

An imaging apparatus includes a camera which images a person, a first sensor which outputs a first signal according to infrared light, a second sensor which outputs a second signal according to infrared light, and controller which starts imaging the person by the camera based on magnitudes of the first signal and the second signal. An infrared light detection area of the first sensor is far from an entrance of a building in comparison with an infrared light detection area of the second sensor, and the infrared light detection area of the second sensor is close to the entrance of the building in comparison with the infrared light detection area of the first sensor.

7 Claims, 15 Drawing Sheets

(56) References Cited

U.S. PATENT DOCUMENTS

| | | | | |
|---|---|---|---|---|
| 8,749,344 B2* | 6/2014 | Brunetti | ................ | G07C 9/025 |
| | | | | 15/215 |
| 2007/0008411 A1* | 1/2007 | Shibata | ............... | G08B 13/191 |
| | | | | 348/152 |
| 2009/0237509 A1* | 9/2009 | Saxon | ................... | H04N 7/183 |
| | | | | 348/155 |
| 2009/0302220 A1* | 12/2009 | Micko | ................ | G08B 13/191 |
| | | | | 250/338.3 |
| 2011/0234794 A1* | 9/2011 | Tian | .................... | G08B 13/181 |
| | | | | 348/143 |
| 2014/0092247 A1* | 4/2014 | Clark | .................... | H04N 7/181 |
| | | | | 348/143 |
| 2017/0294087 A1* | 10/2017 | Kariniemi | ............ | G08B 13/183 |
| 2017/0358186 A1* | 12/2017 | Harpole | .................. | G08B 3/10 |
| 2017/0365144 A1* | 12/2017 | Goulet | .............. | G08B 13/19652 |
| 2018/0033273 A1* | 2/2018 | Siminoff | ............. | G08B 15/008 |
| 2018/0158298 A1* | 6/2018 | Jeong | ...................... | H04N 5/77 |
| 2018/0233008 A1* | 8/2018 | Hoos | ............... | G08B 13/19652 |
| 2019/0096220 A1* | 3/2019 | Anderholm | ........ | G08B 21/0476 |
| 2019/0122064 A1* | 4/2019 | Ishikawa | ............ | G06K 9/00771 |

* cited by examiner

SURVEILLANCE DOOR MONITOR APPARATUS AND METHOD WITH IR SENSORS AND WRONG-WAY ENTRY DETECTION

BACKGROUND

1. Technical Field

The present disclosure relates to an imaging apparatus and an imaging method of the imaging apparatus which is installed on the outside of a building, and is installed so that the front of the imaging apparatus faces a person who is coming to an entrance of the building.

2. Description of the Related Art

For security, a security camera is installed at an entrance in a building such as a house, in some cases. Such a security camera includes a security camera which images only a person who is departing from a building. For example, Japanese Patent Unexamined Publication No. 2010-246056 discloses an imaging system which images by using imaging means installed on an inside wall or the like next to an entrance door in a case where departure detection means which is installed on a knob of a door detects a departure of a person.

In the imaging system of Japanese Patent Unexamined Publication No. 2010-246056, the departure detection means and the imaging means are separated from each other. Therefore, in the imaging system of Japanese Patent Unexamined Publication No. 2010-246056, there is a concern that the departure detection means and the imaging means are required to be installed in at least two spaces of a building, and thus an installation place is limited.

SUMMARY

A non-limiting example of the present disclosure provides an imaging apparatus and an imaging method of the imaging apparatus which reduces a limitation of an installation place, and detects a person who comes to an entrance door from the outside of a building with high precision to image the person.

An imaging apparatus according to an aspect of the present disclosure is installed on the outside of a building, and is installed so that a front of the imaging apparatus faces a person who comes to an entrance of the building. The imaging apparatus includes a camera which images the person, a first sensor which outputs a first signal according to infrared light, a second sensor which outputs a second signal according to infrared light, and a controller which starts imaging the person by the camera based on magnitudes of the first signal and the second signal. An infrared light detection area of the first sensor is far from an entrance of the building in comparison with an infrared light detection area of the second sensor, and the infrared light detection area of the second sensor is close to the entrance of the building in comparison with the infrared light detection area of the first sensor.

According to an aspect of the present disclosure, it is possible to reduce a limitation of an installation place, and detect a person who comes to an entrance door from the outside of a building with high precision to image the person.

Additional benefits and advantages of the disclosed embodiments will become apparent from the specification and drawings. The benefits and/or advantages may be individually obtained by the various exemplary embodiments and features of the specification and drawings, which need not all be provided in order to obtain one or more of such benefits and/or advantages.

DETAILED DESCRIPTION

Hereinafter, an exemplary embodiment of the present disclosure will be described in detail with reference to drawings as appropriate. However, a detailed description more than necessary may be omitted. For example, there are cases where a detailed description of well-known matters and redundant description on substantially the same configuration may be omitted. This is for avoiding unnecessary redundancy of the following description and facilitating understanding by those skilled in the art.

The accompanying drawings and the following description are provided to enable those skilled in the art to fully understand the present disclosure and are not intended to limit the claimed subject matters.

Figure 1:
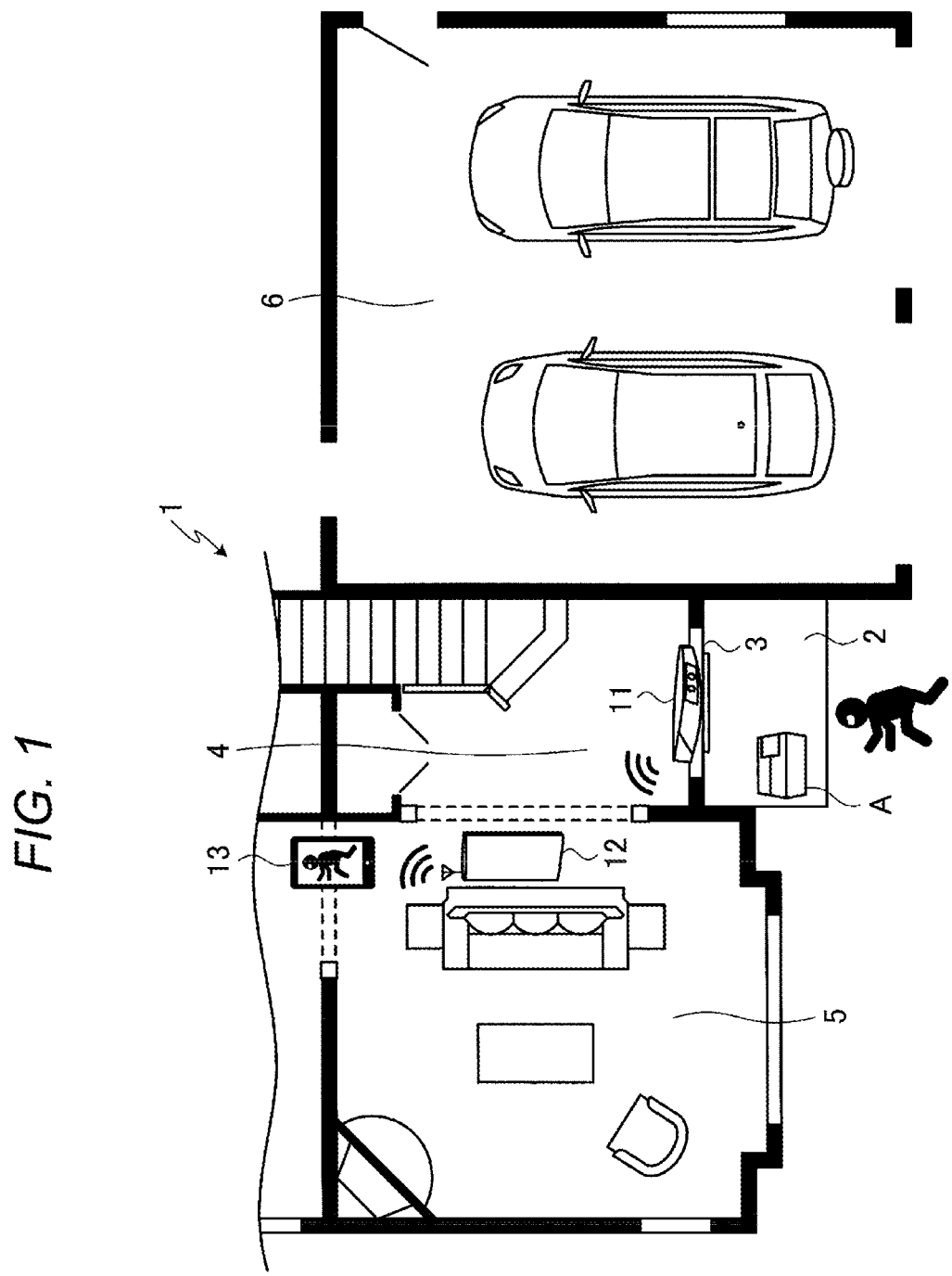
FIG. 1 is a diagram illustrating an example of a building to which an imaging apparatus according to an exemplary embodiment is applied.

FIG. 1 is a diagram illustrating an example of building 1 to which imaging apparatus 11 according to the present exemplary embodiment is applied. As illustrated in FIG. 1, building 1 includes entrance porch 2, entrance door 3, foyer 4, family room 5, and garage 6.

Figure 4:
FIG. 4 is a diagram illustrating an installation example of the imaging apparatus.

Imaging apparatus 11 is installed on an upper portion of the outside of entrance door 3 of building 1 (for example, refer to FIG. 4). Access point 12 is installed, which performs wireless communication with imaging apparatus 11, in family room 5.

FIG. 1 illustrates portable terminal 13 which performs wireless communication with access point 12. Portable terminal 13 is, for example, a wireless terminal which is owned by a resident of building 1. Portable terminal 13 is, for example, a smart phone or a tablet terminal. Imaging apparatus 11, access point 12, and portable terminal 13 perform the wireless communication by using, for example, a wireless Local Area Network (LAN).

Imaging apparatus 11 includes a Passive Infra-Red (PIR) sensor which is a person sensing sensor, and a camera sensor. In a case where imaging apparatus 11 detects a person (hereinafter, referred to as a visitor in some cases) who comes to entrance door 3 from the outside of building 1 by using the PIR sensor, imaging apparatus 11 starts imaging the vicinity of the outside of entrance door 3 by using a camera. For example, imaging apparatus 11 images entrance porch 2, and the front of entrance porch 2 spaced apart from entrance porch 2 by several meters.

Imaging apparatus 11 transmits captured image data (video data) to access point 12. Access point 12 transmits the image data received from imaging apparatus 11 to portable terminal 13.

Portable terminal 13 displays the image data received from imaging apparatus 11 through access point 12 on a display. Therefore, it is possible for a resident of building 1 to monitor behavior and the like of the visitor by using portable terminal 13.

For example, home delivery object A is disposed at entrance porch 2 without ringing a door chime in some cases. In this case, imaging apparatus 11 detects a person who delivers home delivery object A to start the imaging. Therefore, it is possible for the resident of building 1 to monitor whether home delivery object A is stolen by an unidentified person or not by using portable terminal 13 until the resident of building goes to entrance porch 2 to retrieve home delivery object A.

Imaging apparatus 11 does not image a person (hereinafter, referred to as a going out person in some cases) who goes out from building 1 to the outside through entrance door 3. Imaging apparatus 11 does not transmit image data of the going out person to access point 12. This is because the going out person is regarded as, for example, the resident of building 1 or an acquaintance of the resident.

After imaging apparatus 11 starts the imaging by using the camera, imaging apparatus 11 may end the imaging by the camera after a predetermined time is elapsed. Alternatively, after imaging apparatus 11 starts the imaging by using the camera, imaging apparatus 11 may end the imaging by the camera according to an instruction from portable terminal 13.

An installation place of access point 12 is not limited to family room 5. Imaging apparatus 11 and portable terminal 13 may directly perform wireless communication without communication through access point 12.

Figure 2A:
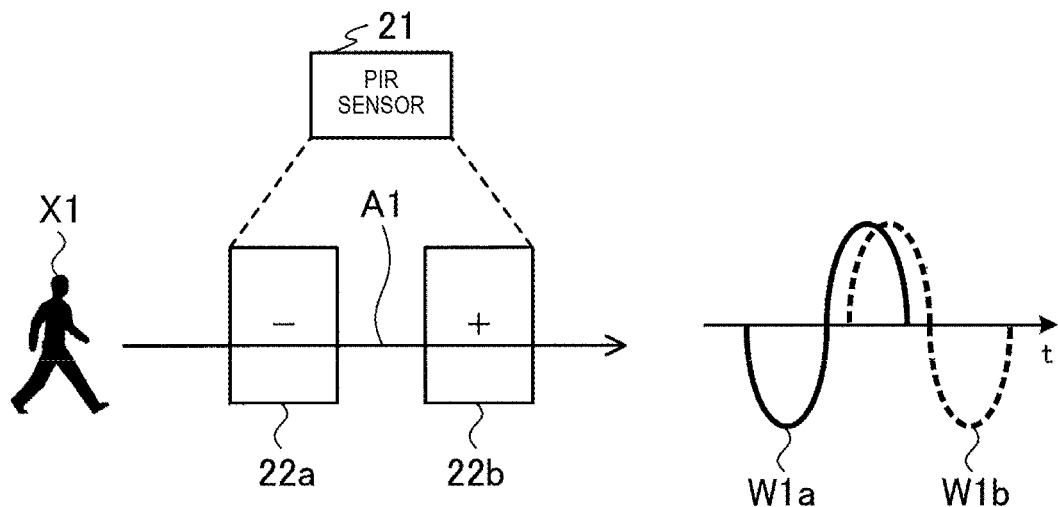
FIG. 2A is a diagram illustrating an example of a PIR sensor.
Figure 2B:
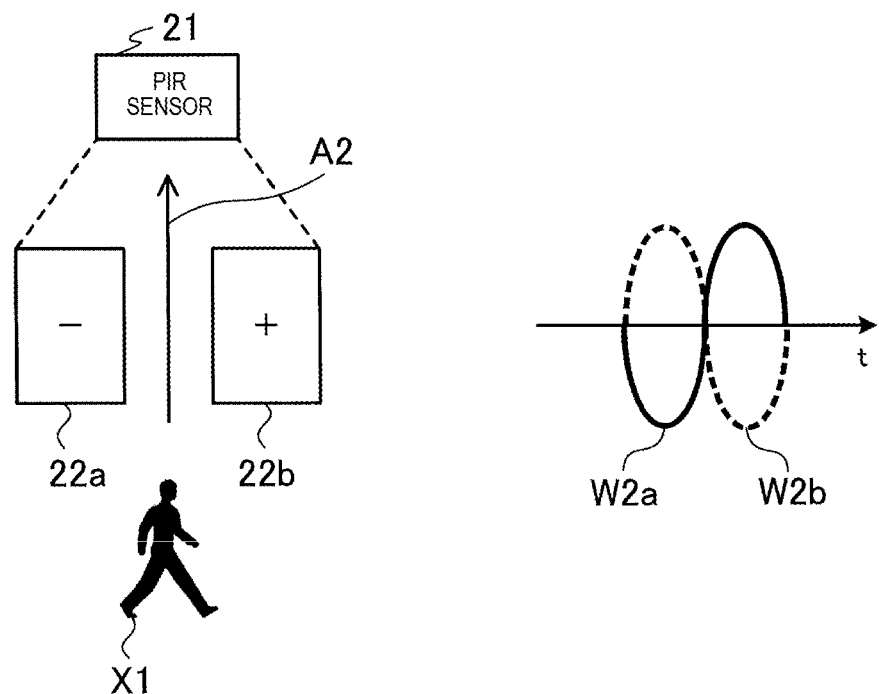
FIG. 2B is a diagram illustrating an example of the PIR sensor.

The PIR sensor is described. FIG. 2A and FIG. 2B are diagrams illustrating an example of the PIR sensor. As illustrated in FIG. 2A and FIG. 2B, PIR sensor 21 includes PIR sensor element 22a of negative polarity and PIR sensor element 22b of positive polarity which output signals according to infrared light. FIG. 2A illustrates waveforms W1a and W1b of the signals which are output from PIR sensor elements 22a and 22b, when person X1 goes in a direction (direction in which the front of PIR sensor 21 is traversed) of arrow A1. FIG. 2B illustrates waveforms W2a and W2b of the signals which are output from PIR sensor elements 22a and 22b, when person X1 goes in a direction (direction toward PIR sensor 21) of arrow A2.

As shown by arrow A1 of FIG. 2A, in a case where person X1 passes through the front of PIR sensor element 22a of negative polarity, a signal which is changed from a negative value to a positive value is output from PIR sensor element 22a of negative polarity as shown by waveform W1a.

In a case where person X1 passes through PIR sensor element 22a of negative polarity and then passes through the front of PIR sensor element 22b of positive polarity, a signal which is changed from a positive value to a negative value is output from PIR sensor element 22b of positive polarity as shown by waveform W1b.

A signal obtained by adding the signal which is output from PIR sensor element 22a and the signal which is output from PIR sensor element 22b is output from PIR sensor 21 of FIG. 2A. The signal of a waveform obtained by adding waveform W1a and waveform W1b is output from PIR sensor 21 of FIG. 2A. The signal output from PIR sensor 21 is emphasized (increased) in a section where waveform W1a and waveform W1b are overlapped with each other.

As illustrated in FIG. 2B, in a case where person X1 goes in a direction shown by arrow A2, a signal which is changed from a negative value to a positive value is output from PIR sensor element 22a of negative polarity as shown by waveform W2a. As illustrated in FIG. 2B, in a case where person X1 goes in a direction of arrow A2, a signal which is changed from a positive value to a negative value is output from PIR sensor element 22b of positive polarity as shown by waveform W2b.

In FIG. 2B, person X1 goes toward an area between PIR sensor element 22a of negative polarity and PIR sensor element 22b of positive polarity. Therefore, output timings of the signal from PIR sensor element 22a of negative polarity and the signal from PIR sensor element 22b of positive polarity become the same as shown by waveforms W2a and W2b. Thus, the signal which is output from PIR sensor 21 of FIG. 2B is canceled.

That is, PIR sensor 21 is strong in the detection of the direction (direction of arrow A1 of FIG. 2A) in which person X1 traverses the front of PIR sensor 21, and is weak in the detection of the direction (direction of arrow A2 of FIG. 2B) in which person X1 comes to PIR sensor 21.

As illustrated in FIG. 2B, it is unusual that person X1 straightly comes to the center between PIR sensor element 22a and PIR sensor element 22b. Therefore, there is hardly a case where the signals which are output from PIR sensor elements 22a and 22b are completely canceled. That is, PIR sensor 21 is merely weak in detecting person X1 who comes to PIR sensor 21 in comparison with detecting person X1 who traverses the front of PIR sensor 21, but it is not that PIR sensor 21 cannot detect person X1 who comes to PIR sensor 21.

Figure 3:
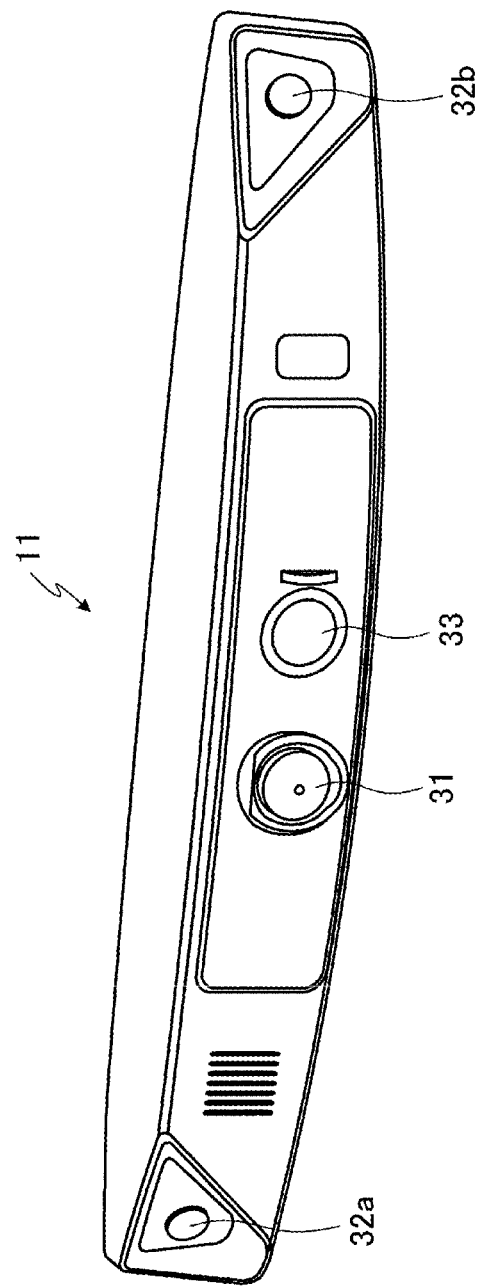
FIG. 3 is a perspective view illustrating an exterior example of the imaging apparatus.

FIG. 3 is a perspective view illustrating an exterior example of imaging apparatus 11. As illustrated in FIG. 3, imaging apparatus 11 has a prismatic shape. Imaging apparatus 11 includes camera 31, side PIR sensors 32a and 32b, and center PIR sensor 33.

Camera 31 is provided in approximately central portion of the front surface of imaging apparatus 11. Side PIR sensors 32a and 32b are provided at both sides of the front surface of imaging apparatus 11. Center PIR sensor 33 is provided in approximately central portion of the front surface of imaging apparatus 11.

FIG. 4 is a diagram illustrating an installation example of imaging apparatus 11. FIG. 4 illustrates a portion of the outside of entrance door 3, and the vicinity of entrance door 3. In FIG. 4, the shape of imaging apparatus 11 illustrated in FIG. 3 is simplified.

As illustrated in FIG. 4, imaging apparatus 11 is installed (fixed) on wall 41 that is the upper portion of entrance door 3. Imaging apparatus 11 is installed in the central portion of a horizontal direction of entrance door 3. Imaging apparatus 11 is installed so that the front thereof faces a visitor. Imaging apparatus 11 is installed in the front and upper portion in a view from the visitor, and is installed so that the front of imaging apparatus 11 faces the visitor.

Figure 5:
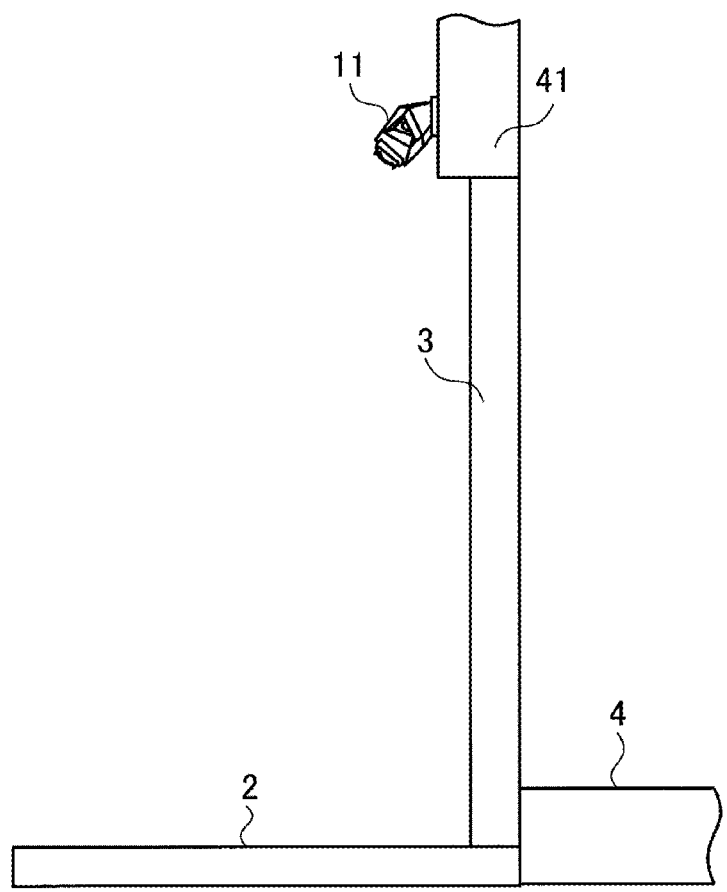
FIG. 5 is a sectional view of the vicinity of an entrance door.

FIG. 5 is a sectional view of the vicinity of entrance door 3. FIG. 5 illustrates a cross section of wall 41 illustrated in FIG. 4, and entrance porch 2, entrance door 3, and foyer 4 illustrated in FIG. 1. Imaging apparatus 11 is installed on wall 41 that is the upper portion of the outside of entrance door 3.

Figure 6A:
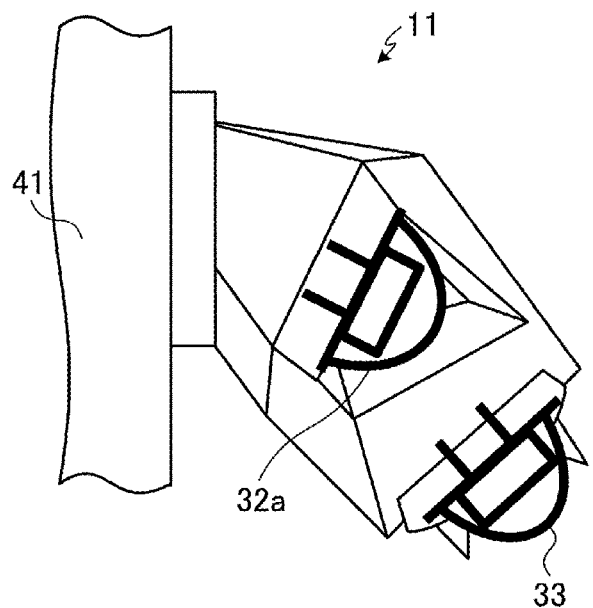
FIG. 6A is a schematic side view of the imaging apparatus from a left side to the front thereof.
Figure 6B:
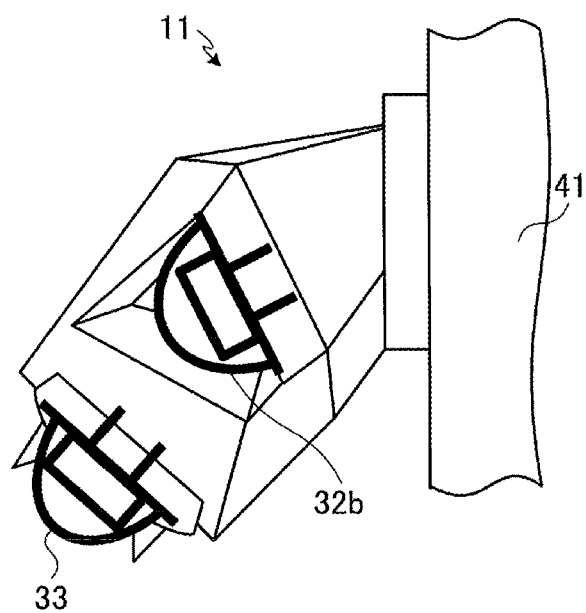
FIG. 6B is a schematic side view of the imaging apparatus from a right side to the front thereof.

FIG. 6A is a schematic side view of imaging apparatus 11 from a left side to the front thereof, and FIG. 6B is a schematic side view of imaging apparatus 11 from a right side to the front thereof. In FIG. 6A and FIG. 6B, the shape of imaging apparatus 11 illustrated in FIG. 3 is simplified. In FIG. 6A and FIG. 6B, a portion of wall 41, which is illustrated in FIG. 4 and FIG. 5, is also illustrated.

As illustrated in FIG. 6A, side PIR sensor 32a is fixed to imaging apparatus 11 so that a depression angle (depression angle of a normal of a light receiving surface) of the light receiving surface on which infrared light of the PIR sensor element which is described later is received is, for example, 50 degrees, when imaging apparatus 11 is installed on wall 41.

As illustrated in FIG. 6B, side PIR sensor 32b is fixed to imaging apparatus 11 so that a depression angle of the light receiving surface on which the infrared light of the PIR sensor element which is described later is received is, for example, 50 degrees, when imaging apparatus 11 is installed on wall 41.

As illustrated in FIG. 6A and FIG. 6B, center PIR sensor 33 is fixed to imaging apparatus 11 so that a depression angle of the light receiving surface on which the infrared light of the PIR sensor element which is described later is received is, for example, 80 degrees, when imaging apparatus 11 is installed on wall 41.

As described above, each of the depression angles of side PIR sensors 32a and 32b is less than that of center PIR sensor 33. Therefore, a distance (distance from entrance door 3 to the person) in which side PIR sensors 32a and 32b may detect the person is longer than a distance in which center PIR sensor 33 may detect the person (for example, refer to FIG. 10).

Figure 7:
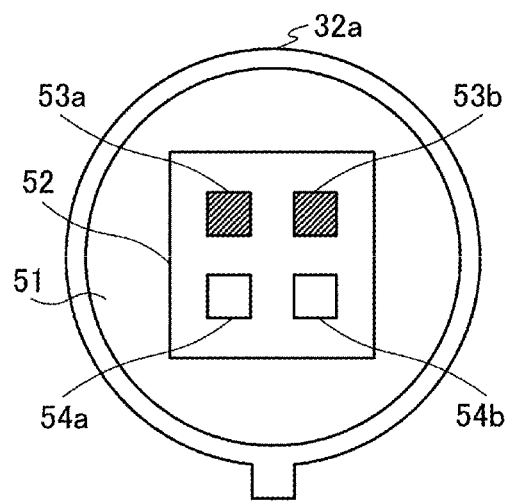
FIG. 7 is a diagram illustrating a disposition of a PIR sensor element of a side PIR sensor.

FIG. 7 is a diagram illustrating a disposition of the PIR sensor element of side PIR sensor 32a. As illustrated in FIG. 7, side PIR sensor 32a includes sensor case 51, base portion 52, PIR sensor elements 53a and 53b of negative polarity, and PIR sensor elements 54a and 54b of positive polarity. In FIG. 7, a hatching is given to PIR sensor elements 53a and 53b of negative polarity.

Base portion 52 is fixed on sensor case 51. PIR sensor elements 53a and 53b of negative polarity and PIR sensor elements 54a and 54b of positive polarity are formed on base portion 52.

Side PIR sensor 32a accommodates the same number of PIR sensor elements 53a and 53b of negative polarity and PIR sensor elements 54a and 54b of positive polarity. For example, side PIR sensor 32a accommodates two PIR sensor elements 53a and 53b of negative polarity and two PIR sensor elements 54a and 54b of positive polarity.

PIR sensor elements 53a and 53b of negative polarity are fixed on base portion 52 so as to be arranged in a horizontal direction in front view of entrance door 3 (view in a direction from the outside of building 1 to entrance door 3), when imaging apparatus 11 is installed on wall 41. PIR sensor elements 53a and 53b of negative polarity are fixed on base portion 52 so as to be disposed over PIR sensor elements 54a and 54b of positive polarity in the front view of entrance door 3, when imaging apparatus 11 is installed on wall 41.

PIR sensor elements 54a and 54b of positive polarity are fixed on base portion 52 so as to be arranged in a horizontal direction in the front view of entrance door 3, when imaging apparatus 11 is installed on wall 41.

A lens (not illustrated) is formed above PIR sensor elements 53a and 53b of negative polarity and PIR sensor elements 54a and 54b of positive polarity. The lens is, for example, Fresnel lens. For example, an Integrated Circuit (IC) (not illustrated) which processes the signals which are output from the PIR sensor elements 53a and 53b of negative polarity and PIR sensor elements 54a and 54b of positive polarity is accommodated under base portion 52. For example, the IC adds the signals which are output from PIR sensor elements 53a and 53b of negative polarity and the signals which are output from PIR sensor elements 54a and 54b of positive polarity by using an addition circuit, removes noise included in the signals by using a filter circuit, or amplifies the signals by using an amplification circuit.

Side PIR sensor 32b also includes the PIR sensor elements of negative polarity and the PIR sensor elements of positive polarity which are disposed similarly to those of FIG. 7, and thus descriptions thereof are omitted.

Figure 8:
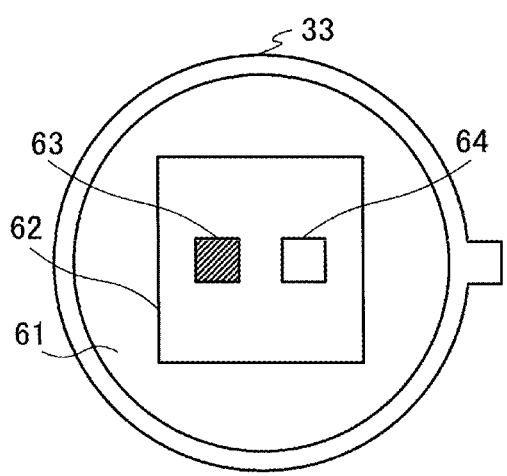
FIG. 8 is a diagram illustrating a disposition of a PIR sensor element of a center PIR sensor.

FIG. 8 is a diagram illustrating a disposition of the PIR sensor element of center PIR sensor 33. As illustrated in FIG. 8, center PIR sensor 33 includes sensor case 61, base portion 62, PIR sensor element 63 of negative polarity, and PIR sensor element 64 of positive polarity. In FIG. 8, a hatching is given to PIR sensor element 63 of negative polarity.

Base portion 62 is fixed on sensor case 61. PIR sensor element 63 of negative polarity and PIR sensor element 64 of positive polarity are formed on base portion 62.

Center PIR sensor 33 accommodates the same number of PIR sensor element 63 of negative polarity and PIR sensor element 64 of positive polarity. For example, center PIR sensor 33 accommodates one PIR sensor element 63 of negative polarity and one PIR sensor element 64 of positive polarity.

PIR sensor element 63 of negative polarity and PIR sensor element 64 of positive polarity are fixed on base portion 62 so as to be arranged in a horizontal direction in the front view of entrance door 3, when imaging apparatus 11 is installed on wall 41.

A lens (not illustrated) is formed above PIR sensor element 63 of negative polarity and PIR sensor element 64 of positive polarity. The lens is, for example, Fresnel lens. For example, an IC (not illustrated) which processes the signals which are output from the PIR sensor element 63 of negative polarity and PIR sensor element 64 of positive polarity is accommodated under base portion 62. For example, the IC adds the signal which is output from PIR sensor element 63 of negative polarity and the signal which is output from PIR sensor element 64 of positive polarity by using an addition circuit, removes noise included in the signals by using a filter circuit, or amplifies the signals by using an amplification circuit.

The number of each of the PIR sensor elements in side PIR sensors 32a and 32b is greater than that of the PIR sensor elements in center PIR sensor 33. For example, the number of the sensor elements in side PIR sensor 32a which is illustrated in FIG. 7 is 4, the number of the sensor elements in side PIR sensor 32b which is illustrated in FIG. 7 is 4, and the number of the elements in center PIR sensor 33 which is illustrated in FIG. 8 is 2. Although described later, a distance of an infrared light detection area of side PIR sensors 32a and 32b is longer than that of an infrared light detection area of center PIR sensor 33 (for example, refer to FIG. 10). In order to improve an infrared light detection sensitivity of side PIR sensors 32a and 32b of which the distance of the infrared light detection area is long, the number of each of the sensor elements in side PIR sensors 32a and 32b is greater than that of the elements of center PIR sensor 33. Since the distance of the infrared light detection area of center PIR sensor 33 is shorter than that of side PIR sensors 32a and 32b, PIR sensor elements 63 and 64 of center PIR sensor 33 are disposed so as to be arranged in a horizontal direction.

Figure 9:
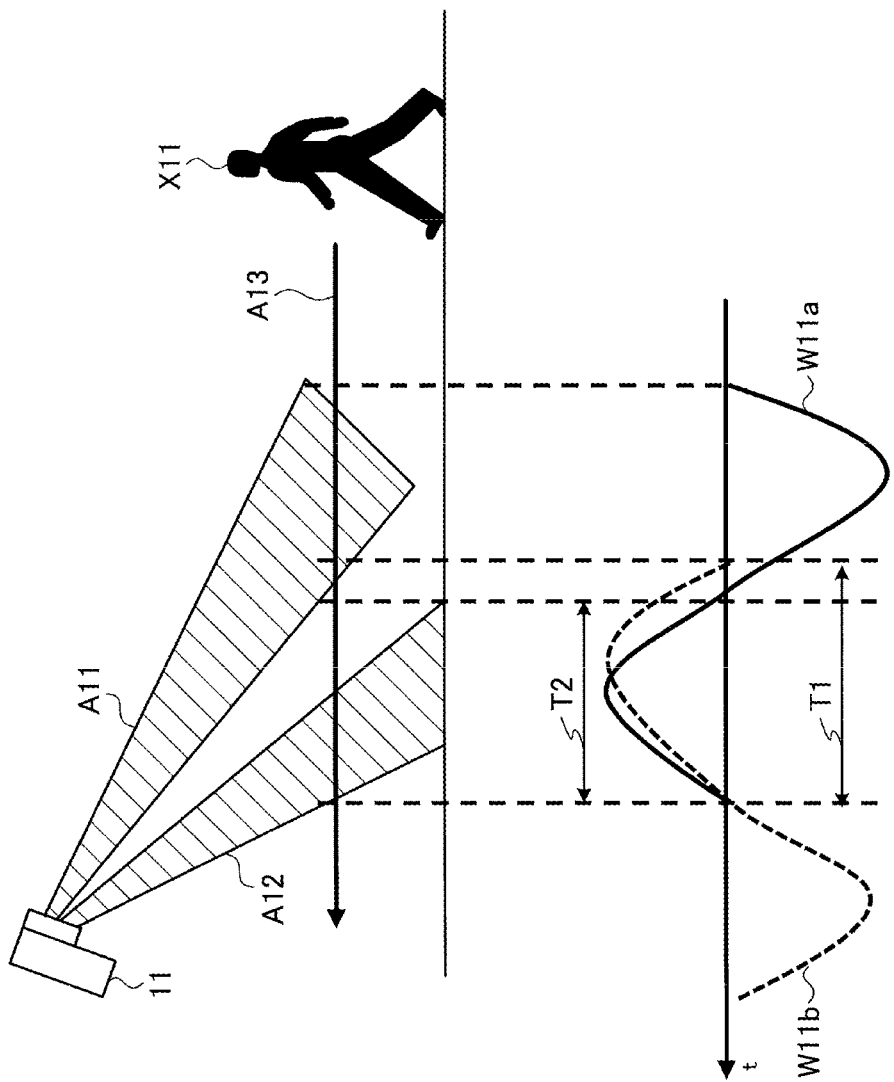
FIG. 9 is a diagram illustrating an operation example of the side PIR sensor.

FIG. 9 is a diagram illustrating an operation example of side PIR sensor 32a. FIG. 9 illustrates imaging apparatus 11. The shape of imaging apparatus 11 illustrated in FIG. 9 is simplified with respect to imaging apparatus 11 illustrated in FIG. 3.

Areas A11 and A12 illustrated in FIG. 9 show areas (hereinafter, referred to as infrared light detection area in some cases) in which the infrared light of side PIR sensor 32a is detected. More specifically, area A11 shows the infrared light detection area of PIR sensor elements 53a and 53b of negative polarity. Area A12 shows the infrared light detection area of PIR sensor elements 54a and 54b of positive polarity. As described with reference to FIG. 7, PIR sensor elements 53a and 53b of negative polarity are disposed over PIR sensor elements 54a and 54b of positive polarity. Therefore, area A11 which is the infrared light detection area of PIR sensor elements 53a and 53b of negative polarity is over area A12 which is the infrared light detection area of PIR sensor elements 54a and 54b of positive polarity. The infrared light detection area of side PIR sensor 32a may be vertically separated by the lens as shown by areas A11 and A12 of FIG. 9 (for example, non-detection area may be provided as shown by the area between area A11 and area A12).

Therefore, in a case where person X11 goes in a direction of arrow A13 of FIG. 9, first, PIR sensor elements 53a and 53b of negative polarity detect infrared light of person X11. Next, PIR sensor elements 54a and 54b of positive polarity detect the infrared light of person X11.

FIG. 9 illustrates waveform W11a of the signal which is output from PIR sensor elements 53a and 53b of negative polarity, and waveform W11b of the signal which is output from PIR sensor elements 54a and 54b of positive polarity.

In a case where person X11 goes in a direction of arrow A13, the signal which is changed from a negative value to a positive value is output from PIR sensor elements 53a and 53b of negative polarity as shown by waveform W11a, and the signal which is changed from a positive value to a negative value is output from PIR sensor elements 54a and 54b of positive polarity as shown by waveform W11b.

Side PIR sensor 32a adds the signal which is output from PIR sensor elements 53a and 53b of negative polarity and the signal which is output from PIR sensor elements 54a and 54b of positive polarity, and outputs the signal obtained by adding the signals. In a case of an example of FIG. 9, during period T1, the signal which is output from PIR sensor elements 53a and 53b of negative polarity and the signal which is output from PIR sensor elements 54a and 54b of positive polarity are added. During period T2, both of the signal which is output from PIR sensor elements 53a and 53b of negative polarity and the signal which is output from PIR sensor elements 54a and 54b of positive polarity are positive signals. Therefore, the signals are increased and are output from side PIR sensor 32a.

That is, as described with reference to FIG. 7, side PIR sensor 32a may suitably detect person X11 who comes toward imaging apparatus 11, by disposing PIR sensor elements 53a and 53b of negative polarity over PIR sensor elements 54a and 54b of positive polarity.

In side PIR sensor 32a of FIG. 7, PIR sensor elements 53a and 53b of negative polarity are disposed over PIR sensor elements 54a and 54b of positive polarity, but PIR sensor elements 54a and 54b of positive polarity may be disposed over PIR sensor elements 53a and 53b of negative polarity. In this case, when person X11 approaches imaging apparatus 11, the signal of PIR sensor elements 54a and 54b of positive polarity is output, and then the signal of PIR sensor elements 53a and 53b of negative polarity is output (appearance sequence of waveform W11a and waveform W11b illustrated in FIG. 9 is switched).

Although side PIR sensor 32a is described with reference to FIG. 9, side PIR sensor 32b is similar to side PIR sensor 32a.

Figure 10:
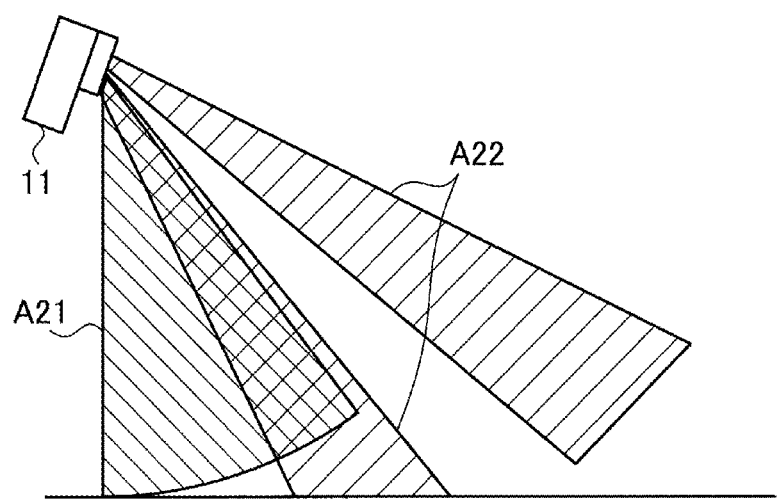
FIG. 10 is a diagram illustrating an operation example of the center PIR sensor.
Figure 11:
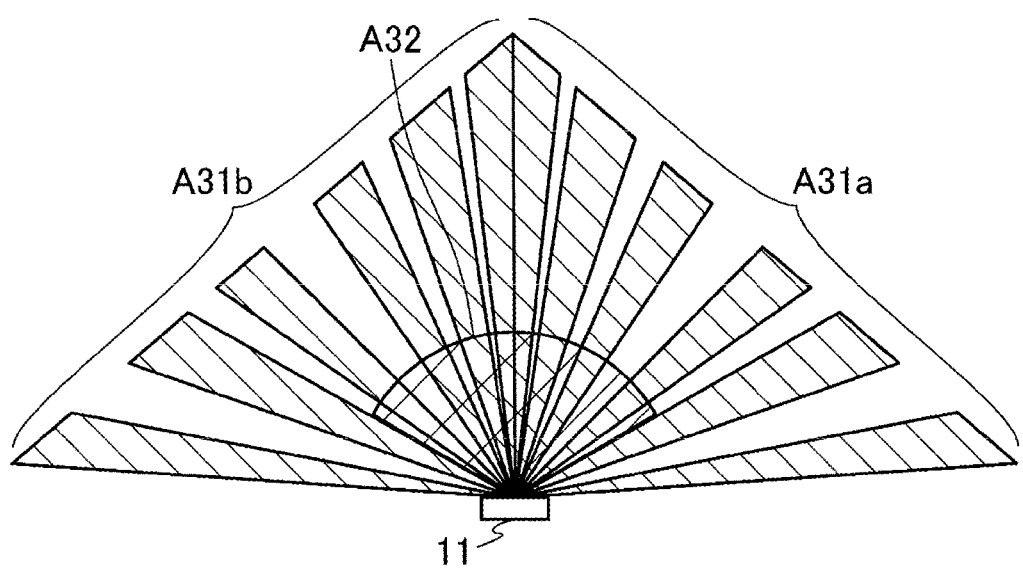
FIG. 11 is a diagram illustrating an infrared light detection area in top view of the imaging apparatus.

FIG. 10 is a diagram illustrating an operation example of center PIR sensor 33. FIG. 11 illustrates imaging apparatus 11. The shape of imaging apparatus 11 illustrated in FIG. 11 is simplified with respect to imaging apparatus 11 illustrated in FIG. 3.

Area A21 illustrated in FIG. 10 shows an infrared light detection area of center PIR sensor 33. Area A22 shows an infrared light detection area of side PIR sensors 32a and 32b.

As described with reference to FIG. 6A and FIG. 6B, a depression angle of center PIR sensor 33 is greater than that of side PIR sensors 32a and 32b. Therefore, area A21 which is the infrared light detection area of center PIR sensor 33 is close to entrance door 3 in comparison with area A22 which is the infrared light detection area of side PIR sensors 32a and 32b.

That is, the infrared light detection area of side PIR sensors 32a and 32b is far from entrance door 3 (imaging apparatus 11) in comparison with the infrared light detection area of center PIR sensor 33, and the infrared light detection area of center PIR sensor 33 is close to entrance door 3 in comparison with the infrared light detection area of side PIR sensors 32a and 32b. Therefore, it is possible for imaging apparatus 11 to determine whether the detected infrared light is due to a visitor or due to a going out person (the determination of the visitor and the going out person is described later).

FIG. 11 is a diagram illustrating the infrared light detection area in top view of imaging apparatus 11. FIG. 11 illustrates imaging apparatus 11. The shape of imaging apparatus 11 illustrated in FIG. 11 is simplified with respect to imaging apparatus 11 illustrated in FIG. 3.

Area A31a illustrated in FIG. 11 shows an infrared light detection area of side PIR sensor 32a. Area A31b shows an infrared light detection area of side PIR sensor 32b. Area A32 shows an infrared light detection area of center PIR sensor 33.

Imaging apparatus 11 forms the infrared light detection area having approximately 180 degrees by side PIR sensor 32a and side PIR sensor 32b. In FIG. 11, side PIR sensor 32a forms an infrared light detection area of right 90 degrees as shown by area A31a, and side PIR sensor 32b forms an infrared light detection area of left 90 degrees as shown by area A31b.

Figure 12A:
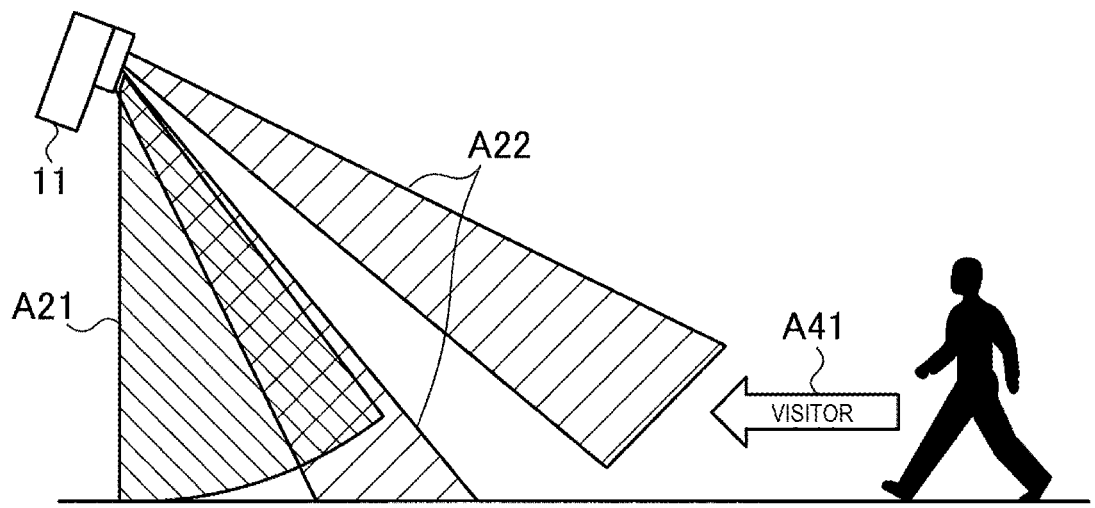
FIG. 12A is a diagram illustrating a determination of a visitor and a going out person.
Figure 12B:
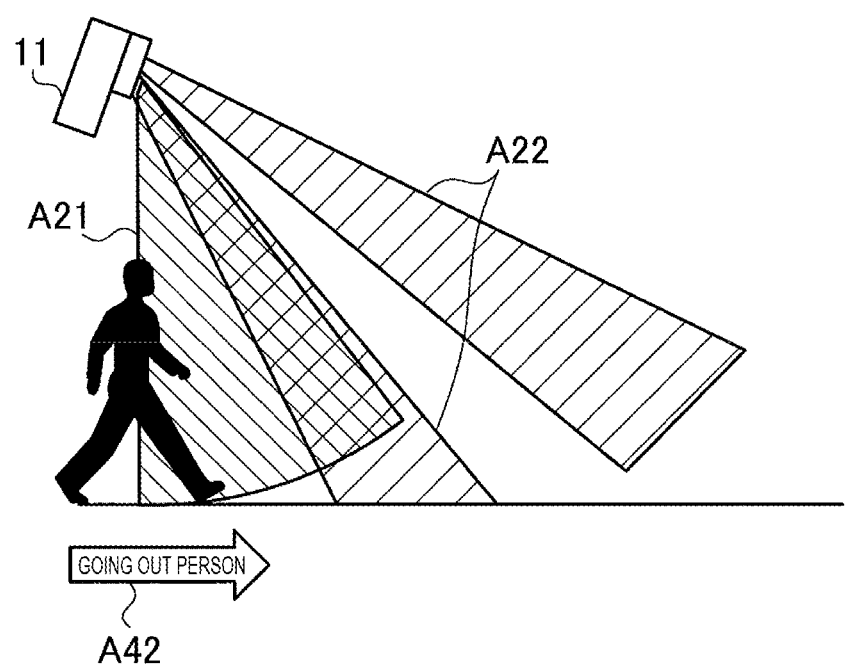
FIG. 12B is a diagram illustrating a determination of the visitor and the going out person.

FIG. 12A and FIG. 12B are diagrams illustrating the determination of the visitor and the going out person. In FIG. 12A and FIG. 12B, the same reference symbols are given to the elements the same as those of FIG. 10.

As illustrated in FIG. 12A and FIG. 12B, the infrared light detection area of side PIR sensors 32a and 32b is far from entrance door 3 in comparison with the infrared light detection area of center PIR sensor 33. The infrared light detection area of center PIR sensor 33 is close to entrance door 3 in comparison with the infrared light detection area of side PIR sensors 32a and 32b.

The visitor goes to entrance door 3 from the outside of building 1 as shown by arrow A41 of FIG. 12A. Therefore, the visitor, first, goes in area A22 which is the infrared light detection area of side PIR sensors 32a and 32b, and then goes in area A21 which is the infrared light detection area of center PIR sensor 33.

The going out person goes to the outside of building 1 from entrance door 3 as shown by arrow A42 of FIG. 12B. Therefore, the going out person, first, goes in area A21 which is the infrared light detection area of center PIR sensor 33, and then goes in area A22 which is the infrared light detection area of side PIR sensors 32a and 32b.

That is, it is possible for imaging apparatus 11 to determine whether the detected person is the visitor or the going out person by monitoring a response sequence (output sequence of signal) of side PIR sensors 32a and 32b and center PIR sensor 33. In addition, it is possible for imaging apparatus 11 to start imaging by using camera 31 in a case where the person, who is detected by side PIR sensors 32a and 32b and center PIR sensor 33, is determined as the visitor.

The number of the response sequences of side PIR sensors 32a and 32b and center PIR sensor 33 is 3.

1. Center PIR sensor 33 responds, and then side PIR sensors 32a and 32b respond. 2. Center PIR sensor 33 and side PIR sensors 32a and 32b simultaneously respond (including approximately simultaneous response, for example, a case where center PIR sensor 33 and side PIR sensors 32a and 32b respond within 50 milliseconds). 3. Side PIR sensors 32a and 32b respond, and then center PIR sensor 33 responds.

"1." is a response sequence when the person goes out from entrance door 3 to the outside of building 1. Therefore, in a case where side PIR sensors 32a and 32b and center PIR sensor 33 respond in the sequence of "1.", imaging apparatus 11 may determine that the person is the going out person.

"2." is a response sequence when the person goes out from entrance door 3 to the outside of building 1. For example, there is a case where the infrared light detection area of side PIR sensors 32a and 32b is overlapped with the whole of the infrared light detection area of center PIR sensor 33, due to a peripheral environment (for example, in FIG. 12A and FIG. 12B, there is a case where the infrared light detection area of side PIR sensors 32a and 32b includes an area directly under imaging apparatus 11). In this case, when the person goes out from entrance door 3 to the outside of building 1, there is a case where side PIR sensors 32a and 32b and center PIR sensor 33 simultaneously respond, like the response sequence "2.". Therefore, in a case where side PIR sensors 32a and 32b and center PIR sensor 33 respond in the sequence of "2.", imaging apparatus 11 may determine that the person is the going out person.

"3." is a response sequence when the person goes to entrance door 3 from the outside of building 1. Therefore, in a case where side PIR sensors 32a and 32b and center PIR sensor 33 respond in the sequence of "3.", imaging apparatus 11 may determine that the person is the visitor. Imaging apparatus 11 may start imaging the visitor by using camera 31.

Figure 13A:
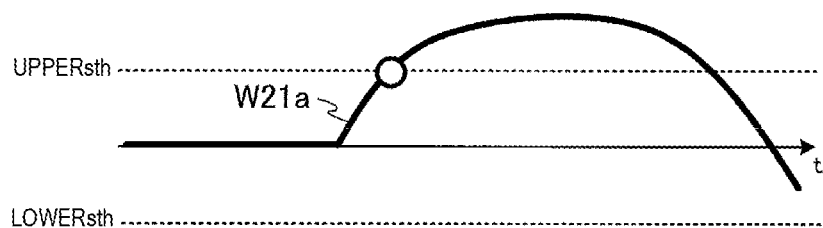
FIG. 13A is a diagram illustrating an example of a signal which is output from side PIR sensors when the visitor comes from the outside of the building to the entrance door.
Figure 13B:
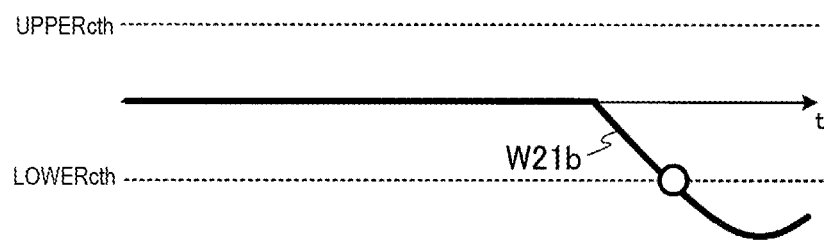
FIG. 13B is a diagram illustrating an example of a signal which is output from the center PIR sensor when the visitor comes from the outside of the building to the entrance door.

FIG. 13A is a diagram illustrating an example of the signal which is output from side PIR sensors 32a and 32b when the visitor goes to entrance door 3 from the outside of building 1, and FIG. 13B is a diagram illustrating an example of the signal which is output from center PIR sensor 33 when the visitor goes to entrance door 3 from the outside of building 1. Waveform W21a of FIG. 13A is a waveform of the signal which is output from side PIR sensors 32a and 32b. Waveform W21b of FIG. 13B is a waveform of the signal which is output from center PIR sensor 33.

As described with reference to FIG. 12A, the visitor first goes in area A22 of side PIR sensors 32a and 32b, and then goes in area A21 of center PIR sensor 33. Therefore, as shown by waveform W21a of FIG. 13A, first, the signal which is output from side PIR sensors 32a and 32b is equal to or greater than a threshold value "UPPERsth", and then as shown by waveform W21b of FIG. 13B, the signal which is output from center PIR sensor 33 is equal to or less than a threshold value "LOWERcth".

Figure 14A:
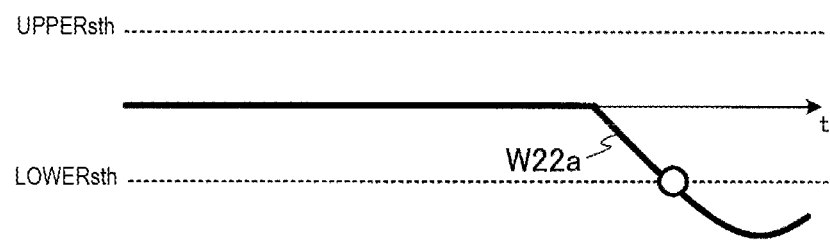
FIG. 14A is a diagram illustrating an example of a signal which is output from side PIR sensors when the going out person goes out from the entrance door.
Figure 14B:
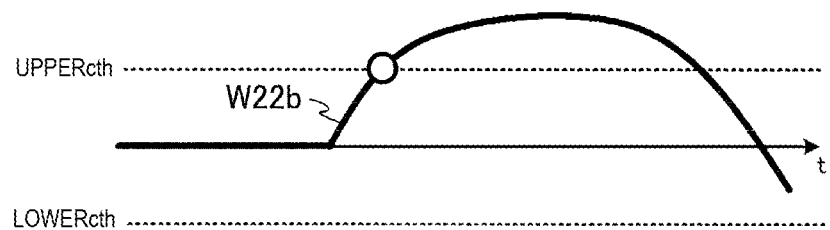
FIG. 14B is a diagram illustrating an example of a signal which is output from the center PIR sensor when the going out person goes out from the entrance door.

FIG. 14A is a diagram illustrating an example of the signal which is output from side PIR sensors 32a and 32b when the going out person goes out from entrance door 3, and FIG. 14B is a diagram illustrating an example of the signal which is output from center PIR sensor 33 when the going out person goes out from entrance door 3. Waveform W22a illustrated in FIG. 14A is a waveform of the signal which is output from side PIR sensors 32a and 32b. Waveform W22b illustrated in FIG. 14B is a waveform of the signal which is output from center PIR sensor 33.

As described with reference to FIG. 12B, the going out person first goes in area A21 of center PIR sensor 33, and then goes in area A22 of side PIR sensors 32a and 32b. Therefore, as shown by waveform W22b of FIG. 14B, first, the signal which is output from center PIR sensor 33 is equal to or greater than a threshold value "UPPERcth", and then as shown by waveform W22a of FIG. 14A, the signal which is output from side PIR sensors 32a and 32b is equal to or less than a threshold value "LOWERsth".

"UPPERsth", "LOWERsth", "UPPERcth", and "LOWERcth" illustrated in FIG. 13A, FIG. 13B, FIG. 14A, and FIG. 14B are threshold values for which imaging apparatus 11 determines the visitor and the going out person. Hereinafter, "UPPERsth" may be referred to as "side upper threshold value". "LOWERsth" may be referred to as "side lower threshold value". "UPPERcth" may be referred to as "center upper threshold value". "LOWERcth" may be referred to as "center lower threshold value".

Figure 15:
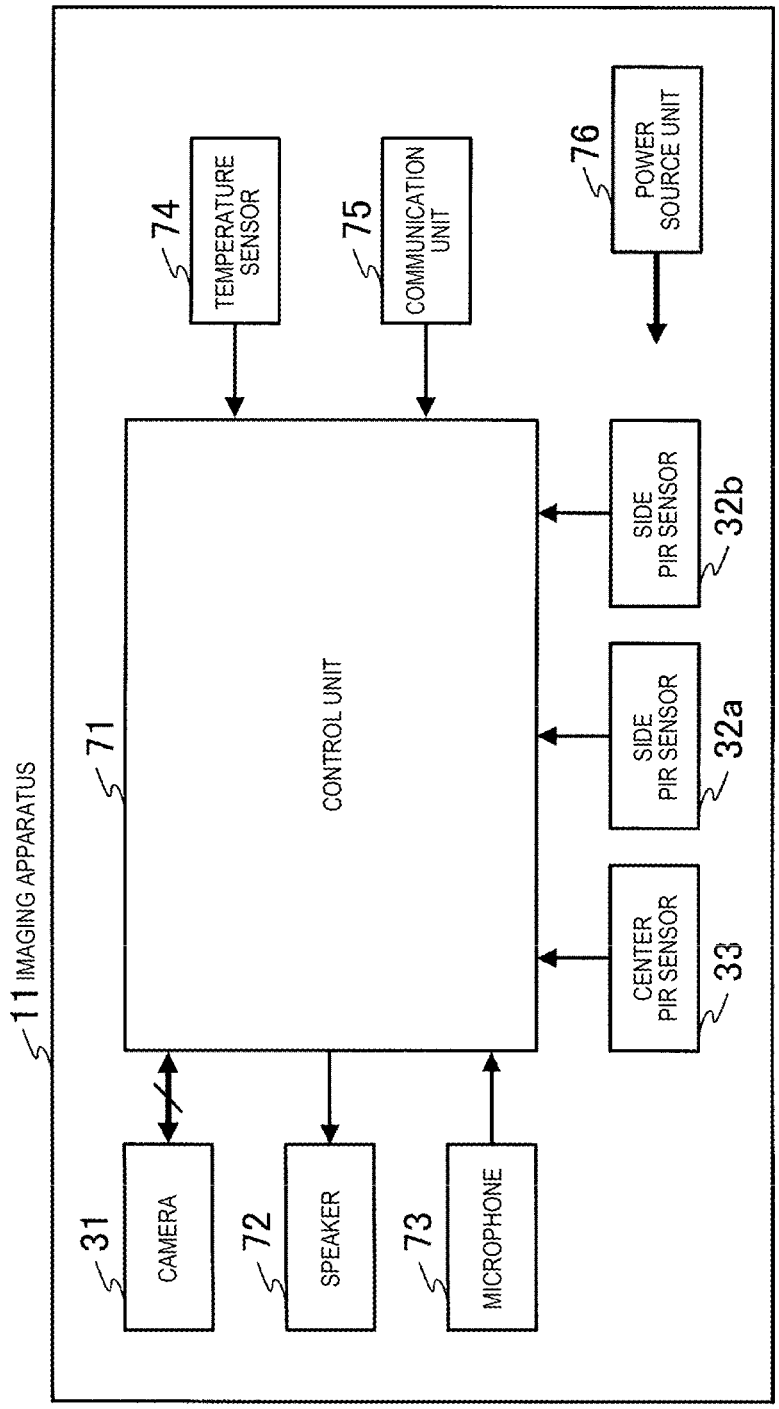
FIG. 15 is a diagram illustrating a block example of the imaging apparatus.

FIG. 15 is a diagram illustrating a block example of imaging apparatus 11. Imaging apparatus 11 includes camera 31, side PIR sensors 32a and 32b, and center PIR sensor 33, which are described with reference to FIG. 3 and the like, and further includes controller 71, speaker 72, microphone 73, temperature sensor 74, communication unit 75, and power source unit 76. Hereinafter, controller 71, speaker 72, microphone 73, temperature sensor 74, communicator 75, and power source unit 76 are described.

Controller 71 controls the entire imaging apparatus 11. Controller 71 is, for example, a Central Processing Unit (CPU).

Speaker 72 outputs a sound based on the control of controller 71. For example, portable terminal 13 converts a sound which is generated by the resident of building 1 into sound data, and transmits the sound data to imaging apparatus 11 through access point 12. Controller 71 outputs the sound data which is transmitted from portable terminal 13 to the speaker.

Microphone 73 converts, for example, a sound which is generated from the visitor into an electrical signal, and outputs the electrical signal to controller 71. Controller 71 transmits the electrical signal (sound data) which is output from microphone 73 to portable terminal 13 through access point 12.

As described above, imaging apparatus 11 includes speaker 72 and microphone 73. Therefore, it is possible for the resident of building 1 to perform a telephone conversation with the visitor through access point 12 and imaging apparatus 11, by using, for example, portable terminal 13.

Temperature sensor 74 measures a peripheral temperature of imaging apparatus 11. The levels of the signals which are output from side PIR sensors 32a and 32b and center PIR sensor 33 are changed due to the peripheral temperature. Controller 71 adjusts the levels of the signals which are output from side PIR sensors 32a and 32b and center PIR sensor 33, based on the peripheral temperature of imaging apparatus 11 which is measured by the temperature sensor 74. Controller 71 also may adjust the side upper threshold value, the side lower threshold value, the center upper threshold value, and the center lower threshold value, based on the peripheral temperature of imaging apparatus 11 which is measured by the temperature sensor 74.

Communication unit 75 performs wireless communication with access point 12. Power source unit 76 supplies electric power to each block of imaging apparatus 11. Power source unit 76 is configured with, for example, a primary cell or a secondary cell.

Figure 16:
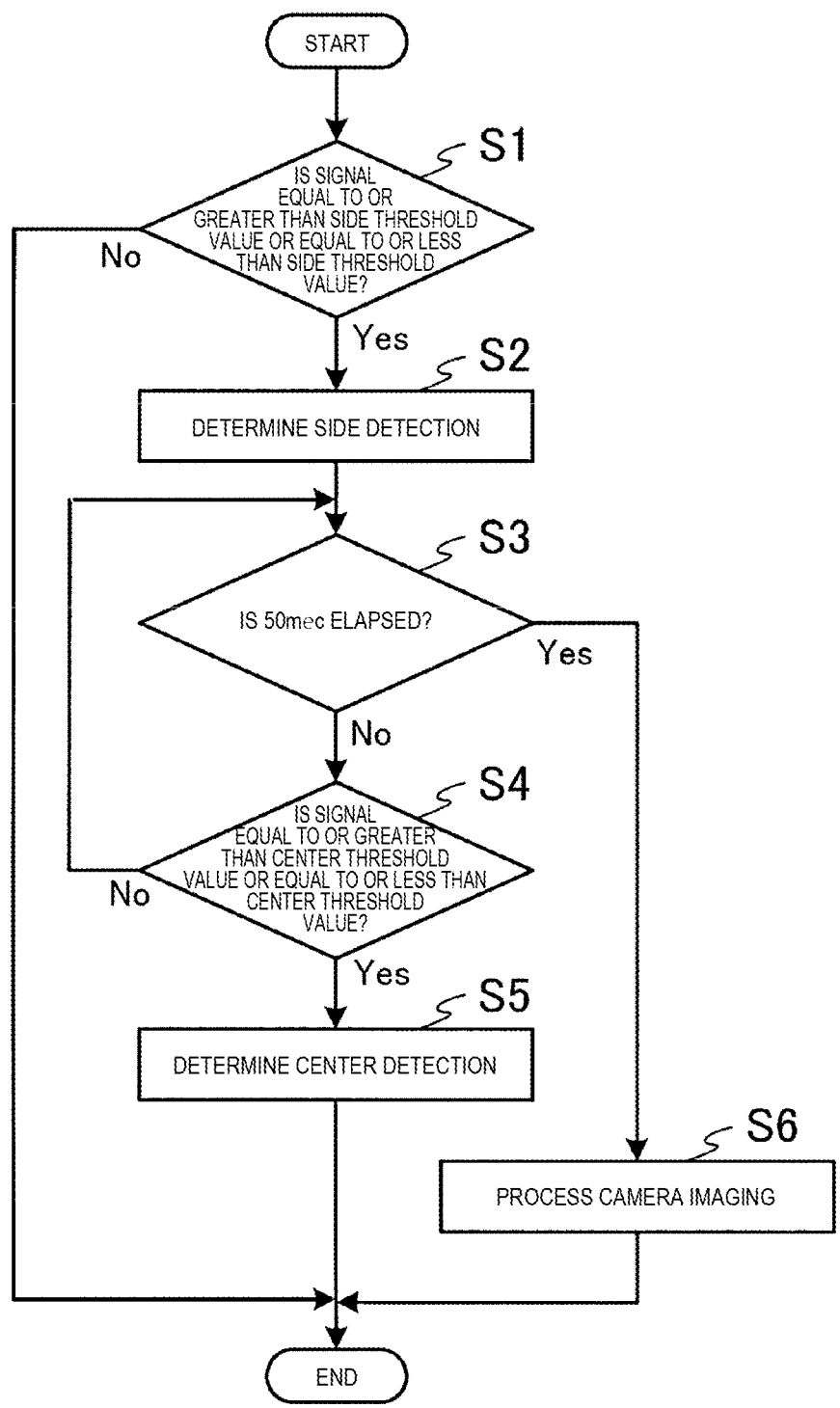
FIG. 16 is a flowchart illustrating a process example of a controller.

FIG. 16 is a flowchart illustrating a process example of controller 71. Controller 71 repeatedly performs the process of the flowchart illustrated in FIG. 16 in a predetermined period.

Controller 71 determines whether the signal which is output from side PIR sensors 32a and 32b is equal to or greater than the side upper threshold value (for example, refer to UPPERsth of FIG. 13A and FIG. 14A) or is equal to or less than the side lower threshold value (for example, refer to LOWERsth of FIG. 13A and FIG. 14A) (step S1).

In a case where the signal which is output from side PIR sensors 32a and 32b is not equal to or greater than the side upper threshold value or is not equal to or less than the side lower threshold value ("No" in S1), controller 71 ends the process of the flowchart.

In a case where the signal which is output from side PIR sensors 32a and 32b is equal to or greater than the side upper threshold value or is equal to or less than the side lower threshold value ("Yes" in S1), controller 71 determines that the side PIR sensors 32a and 32b detect the person (step S2).

In a case where the detection of the person by the side PIR sensors 32a and 32b is determined in step S2, controller 71 determines whether, for example, 50 milliseconds have elapsed or not (step S3). This process determines whether the detection corresponds to "2." of the response sequence described above.

After determining the detection of the person by side PIR sensors 32a and 32b, in a case where controller 71 determines that 50 milliseconds have not elapsed ("No" in S3), controller 71 determines whether the signal which is output from center PIR sensor 33 is equal to or greater than the center upper threshold value (for example, refer to UPPERcth of FIG. 13B and FIG. 14B) or is equal to or less than the center lower threshold value (for example, refer to LOWERcth of FIG. 13B and FIG. 14B) (step S4).

In a case where the signal which is output from center PIR sensor 33 is not equal to or greater than the center upper threshold value or is not equal to or less than the center lower threshold value ("No" in S4), controller 71 shifts the process to step S3.

In a case where the signal which is output from center PIR sensor 33 is equal to or greater than the center upper threshold value or is equal to or less than the center lower threshold value ("Yes" in S4), controller 71 determines that center PIR sensor 33 detects the person (step S5). Then, controller 71 ends the process of the flowchart.

That is, after determining the detection of the person by side PIR sensors 32a and 32b, before 50 milliseconds have elapsed, in a case where the detection of the person by center PIR sensor 33 is determined, controller 71 determines that the detection corresponds to "2." of the response sequence described above, and does not start imaging the person by camera 31.

In step S3, in a case where controller 71 determines that 50 milliseconds have elapsed ("Yes" in S3), controller 71 starts an imaging process of camera 31 (step S6). That is, after determining the detection of the person by side PIR sensors 32a and 32b, even 50 milliseconds have elapsed, in a case where the detection of the person by center PIR sensor 33 is not determined, controller 71 starts imaging of the person (visitor) by camera 31.

Figure 17:
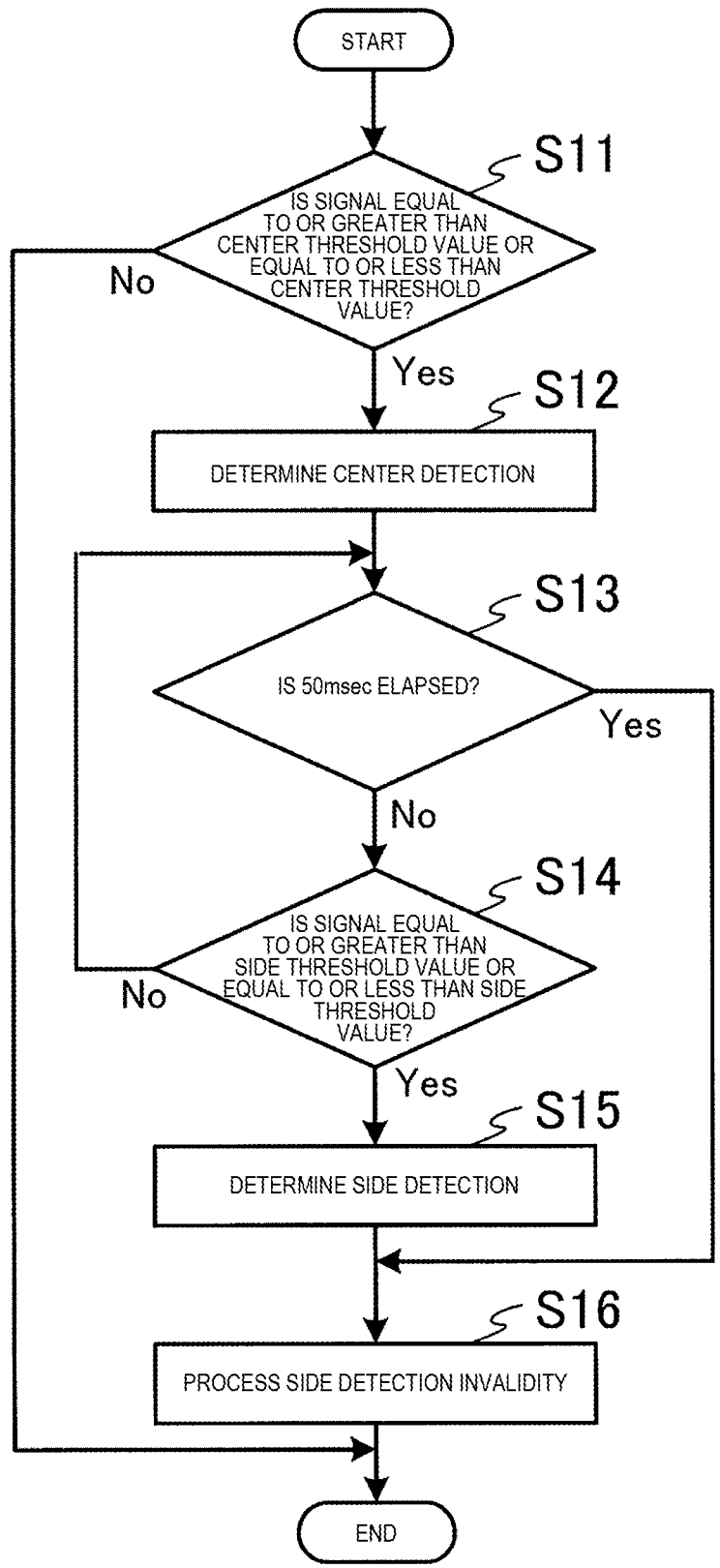
FIG. 17 is a flowchart illustrating a process example of the controller.

FIG. 17 is a flowchart illustrating a process example of controller 71. Controller 71 repeatedly performs the process of the flowchart illustrated in FIG. 17 in a predetermined period.

Controller 71 determines whether the signal which is output from center PIR sensor 33 is equal to or greater than the center upper threshold value or is equal to or less than the center lower threshold value (step S11).

In a case where the signal which is output from center PIR sensor 33 is not equal to or greater than the center upper threshold value or is not equal to or less than the center lower threshold value ("No" in S11), controller 71 ends the process of the flowchart.

In a case where the signal which is output from center PIR sensor 33 is equal to or greater than the center upper threshold value or is equal to or less than the center lower threshold value ("Yes" in S11), controller 71 determines that the center PIR sensor 33 detects the person (step S12).

In a case where the detection of the person by the center PIR sensor 33 is determined in step S12, controller 71 determines whether, for example, 50 milliseconds have elapsed or not (step S13). This process determines whether the detection corresponds to "2." of the response sequence described above.

After determining the detection of the person by center PIR sensor 33, in a case where controller 71 determines that 50 milliseconds have not elapsed ("No" in S13), controller 71 determines whether the signal which is output from side PIR sensors 32a and 32b is equal to or greater than the side upper threshold value or is equal to or less than the side lower threshold value (step S14).

In a case where the signal which is output from side PIR sensors 32a and 32b is not equal to or greater than the side upper threshold value or is not equal to or less than the side lower threshold value ("No" in S14), controller 71 shifts the process to step S13.

In a case where the signal which is output from side PIR sensors 32a and 32b is equal to or greater than the side upper threshold value or is equal to or less than the side lower threshold value ("Yes" in S14), controller 71 determines that side PIR sensors 32a and 32b detect the person (step S15).

In a case where the detection of the person by side PIR sensors 32a and 32b is determined in step S15, controller 71 performs a side detection invalidity process (step S16). For example, controller 71 does not perform the process in the flowchart of FIG. 16 during a predetermined time. Then, controller 71 ends the process of the flowchart. The predetermined time is, for example, a time in which the going out person passes through side PIR sensors 32a and 32b. For example, the predetermined time is greater than the elapse time of step S3 and step S13.

Before 50 milliseconds have elapsed, in a case where controller 71 determines that side PIR sensors 32a and 32b detect the person, controller 71 determines that the detection corresponds to "2." of the response sequence described above, and does not start imaging the person by camera 31.

In step S13, in a case where controller 71 determines that 50 milliseconds have elapsed ("Yes" in S13), controller 71 performs a side detection invalidity process (step S16). Then, controller 71 ends the process of the flowchart.

In the flowchart of FIG. 17, the processes of steps S13 to S15 may be omitted. For example, in a case where the detection of the person by center PIR sensor 33 is determined in step S12, controller 71 may perform the side detection invalidity process of step S16.

As described above, imaging apparatus 11 is installed on the outside of building 1, and is installed so that the front thereof faces the person who comes to the entrance of building 1. Imaging apparatus 11 includes camera 31, side PIR sensors 32a and 32b which output a signal according to infrared light, center PIR sensor which outputs a signal according to infrared light, and controller 71 which starts imaging by camera 31 based on the signal of side PIR sensors 32a and 32b and the signal of center PIR sensor 33. The infrared light detection area of side PIR sensors 32a and 32b is far from entrance door 3 in comparison with the infrared light detection area of center PIR sensor 33, and the infrared light detection area of center PIR sensor 33 is close to entrance door 3 in comparison with the infrared light detection area of side PIR sensors 32a and 32b.

Therefore, imaging apparatus 11 can reduce a limitation of an installation place, and detect a person who comes to an entrance door from the outside of a building with high precision to image the person. For example, in imaging apparatus 11, camera 31, side PIR sensors 32a and 32b, and center PIR sensor 33 are integrated, and thus the limitation of the installation place is reduced. In addition, the infrared light detection area of side PIR sensors 32a and 32b is far from entrance door 3 in comparison with the infrared light detection area of center PIR sensor 33, and the infrared light detection area of center PIR sensor 33 is close to entrance door 3 in comparison with the infrared light detection area of side PIR sensors 32a and 32b. Therefore, it is possible to detect a person who comes to an entrance door from the outside of a building with high precision to image the person.

An installation place of imaging apparatus 11 is not limited to the upper portion of entrance door 3. As long as the installation place is an entrance door of building 1, any place may be suitable. Imaging apparatus 11 may be installed on the upper portion of entrance door 3 or an exit door of building 1.

Imaging apparatus 11 includes two side PIR sensors 32a and 32b, but is not limited thereto. For example, imaging apparatus 11 may include one side PIR sensor, or may include three or more PIR sensors. That is, as long as it is possible to form an infrared light detection area having approximately 180 degrees in a horizontal direction, the number of the side PIR sensors may be any number.

Imaging apparatus 11 includes one center PIR sensor 33, but is not limited thereto. For example, imaging apparatus 11 may include two or more center PIR sensors. That is, as long as it is possible to form an infrared light detection area having approximately 180 degrees in a horizontal direction, the number of the center PIR sensors may be any number.

The number of the PIR sensor elements is not limited to the number of the PIR sensor elements illustrated in FIG. 7 and FIG. 8. In FIG. 8, PIR sensor element 63 of negative polarity and PIR sensor element 64 of positive polarity are fixed on base portion 62 so as to be arranged in a horizontal direction in the front view of entrance door 3, when imaging apparatus 11 is installed on wall 41, but are not limited thereto. PIR sensor element 63 of negative polarity and PIR sensor element 64 of positive polarity may be fixed on base portion 62 so as to be arranged in a vertical direction in the front view of entrance door 3, when imaging apparatus 11 is installed on wall 41. Therefore, center PIR sensor 33 is strong in the detection of a direction in which a person comes thereto.

After controller 71 starts imaging by using camera 31, controller 71 may end the imaging by camera 31 after a predetermined time is elapsed. Alternatively, after controller 71 starts imaging by using camera 31, controller 71 may end the imaging by camera 31 according to an instruction from portable terminal 13.

Each functional block used for description of the aforementioned exemplary embodiment is realized as an LSI that is typically an integrated circuit. These may be individually made into one chip, or may be made into one chip including a part or all thereof. Here, it is referred to as an LSI, but may be referred to as an IC, a system LSI, a super LSI, or an ultra LSI, depending on the degree of integration.

In addition, a method of making into an integrated circuit is not limited to an LSI, or may be realized by a dedicated circuit or a general purpose processor. After an LSI is manufactured, a Field Programmable Gate Array (FPGA) which can be programmed, or a reconfigurable processor which can reconfigure a connection or setting of a circuit cell in the LSI may be used.

Further, if a technology of an integrated circuit which is replaced with an LSI by another technology advanced or derived from a semiconductor technology appears, integration of functional blocks may be naturally performed by using the technology. Application or the like of biotechnology can be made.

What is claimed is:

1. An imaging apparatus, comprising:
a camera, which images a person, positioned substantially in a central portion of a front surface of the imaging apparatus;
a center sensor which outputs a first signal according to infrared light, the center sensor having a first depression angle measured from a horizontal plane, the center sensor being provided next to the camera on a first side of the camera at the front surface of the imaging apparatus and the center sensor having a first side facing the first side of the camera;
two side sensors which, respectively, output two second signals according to infrared light, each side sensor of the two side sensors having a second depression angle, measured from the horizontal plane, that is greater than the first depression angle, a first side sensor of the two side sensors being provided next to the camera on a second side of the camera, opposite the first side of the camera, at the front surface of the imaging apparatus, a second side sensor of the two side sensors being provided next to the center sensor and on a second side of the center sensor, opposite the first side of the center sensor, at the front surface of the imaging apparatus, a number of sensor elements of the first side sensor is larger than a number of sensor elements of the center sensor and a number of sensor elements of the second side sensor is larger than the number of sensor elements of the center sensor; and
a processor which starts imaging the person by the camera based on magnitudes of the first signal and a second signal of the two second signals output by a side sensor of the two side sensors,
wherein the imaging apparatus is operable to be installed on a wall and in an upper central portion of an entrance door,
wherein the processor starts imaging the person by the camera in a case where the center sensor outputs the first signal having a first predetermined magnitude, and
wherein the processor does not start imaging the person by the camera in a case where the side sensor of the two side sensors outputs the second signal having a second predetermined magnitude and then the center sensor outputs the first signal having the first predetermined magnitude.

2. The imaging apparatus of claim 1, wherein the imaging apparatus is operative to be installed on an outside of a building so that a front of the imaging apparatus faces a person who comes to an entrance of the building.

3. The imaging apparatus of claim 2, wherein a first infrared light detection area of the center sensor is further from the entrance of the building in comparison with a second infrared light detection area of the side sensor of the two side sensors, and the second infrared light detection area of the side sensor of the two side sensors is closer to the entrance of the building in comparison with the first infrared light detection area of the center sensor.

4. The imaging apparatus of claim 1,
wherein the processor does not start imaging the person by the camera in a case where the side sensor of the two side sensors outputs the second signal having the second predetermined magnitude after the center sensor outputs the first signal having the first predetermined magnitude and before a predetermined time elapses.

5. An imaging method of an imaging apparatus which is operable to be installed on an outside of a building so that a front of the imaging apparatus faces a person who comes to an entrance of the building,
wherein the imaging apparatus is operative to be installed on a wall and in an upper central portion of an entrance door,
wherein a first infrared light detection area of a center sensor in the imaging apparatus is further from the entrance of the building in comparison with a second infrared light detection area of a side sensor of two side sensors in the imaging apparatus, the two side sensors including a first side sensor and a second side sensor, the center sensor having a first depression angle measured from a horizontal plane, and is provided next to a camera, positioned substantially in a central portion of a front surface of the imaging apparatus, on a first side of the camera at the front surface of the imaging apparatus and the center sensor having a first side facing the first side of the camera, a first side sensor of the two side sensors being provided next to the camera on a second side of the camera, opposite the first side of the camera, at the front surface of the imaging apparatus, a second side sensor of the two side sensors being provided next to the center sensor and on a second side of the center sensor, opposite the first side of the center sensor, at the front surface of the imaging apparatus, and the two side sensors having a second depression angle, measured from the horizontal plane that is greater than the first depression angle, and
the second infrared light detection area of the side sensor is closer to the entrance of the building than the first infrared light detection area of the center sensor,
the method comprising:
causing the imaging apparatus
to start imaging the person by the camera in a case where the side sensor outputs a first signal having a first predetermined magnitude and then the side sensor of the two side sensors outputs a second signal having a second predetermined magnitude, and
not to start imaging the person by the camera in a case where the side sensor of the two side sensors outputs the second signal having the second predetermined magnitude and then the center sensor outputs the first signal having the first predetermined magnitude.

6. The imaging apparatus of claim 1, wherein the camera, the center sensor, the first side sensor and the second side sensor are arranged substantially on a straight line.

7. The imaging method of claim 5, wherein the camera, the center sensor, the first side sensor and the second side sensor are arranged substantially on a straight line.

* * * * *